(12) United States Patent
Thompson et al.

(10) Patent No.: US 8,007,846 B2
(45) Date of Patent: Aug. 30, 2011

(54) MIXED AMINO ACID/MINERAL COMPOUNDS HAVING IMPROVED SOLUBILITY

(75) Inventors: R. Charles Thompson, Peterson, UT (US); Clayton Ericson, Morgan, UT (US); Stephen Ashmead, West Haven, UT (US); Jonathan Bortz, Saint Louis, MO (US)

(73) Assignee: Albion International, Inc., Clearfield, UT (US)

( * ) Notice: Subject to any disclaimer, the term of this patent is extended or adjusted under 35 U.S.C. 154(b) by 762 days.

(21) Appl. No.: 11/623,476

(22) Filed: Jan. 16, 2007

(65) Prior Publication Data

US 2007/0172551 A1  Jul. 26, 2007

Related U.S. Application Data

(60) Provisional application No. 60/759,823, filed on Jan. 18, 2006.

(51) Int. Cl.
*A23L 1/304* (2006.01)
(52) U.S. Cl. .......................................... 426/74; 426/656
(58) Field of Classification Search .................... 426/74, 426/656
See application file for complete search history.

(56) References Cited

U.S. PATENT DOCUMENTS

| 3,014,026 | A | * | 12/1961 | Kroll et al. | 536/55 |
| 5,292,538 | A | * | 3/1994 | Paul et al. | 426/74 |
| 5,504,055 | A | * | 4/1996 | Hsu | 504/121 |
| 2003/0096794 | A1 | * | 5/2003 | Niehoff | 514/64 |
| 2007/0065542 | A1 | * | 3/2007 | Pak | 426/74 |

OTHER PUBLICATIONS

Mahmoud et al. "Synthesis, characterization and metal chelating properties of silica-physisorbed", May 2007, ScienceDirect, Polyhedron 26(2007) 3956-3962).*

* cited by examiner

*Primary Examiner* — Helen F Heggestad
(74) *Attorney, Agent, or Firm* — Merchant & Gould

(57) ABSTRACT

Mixed amino acid/mineral compounds can include at least two amino acids bound to a central mineral atom. The combination of amino acids can be tailored to provide improved solubility, absorption, and/or bioavailability of the mineral. Optionally, organic acids can be bound to the mineral or combined with the chelate in order to further improve solubility, absorption, and/or bioavailability. Compositions including one or more mixed amino acid/mineral compounds can be included in therapeutic regimens for indications in which the mineral may treat and/or prevent a condition or symptom.

6 Claims, No Drawings

MIXED AMINO ACID/MINERAL COMPOUNDS HAVING IMPROVED SOLUBILITY

CROSS-REFERENCE TO RELATED APPLICATIONS

This U.S. patent application claims the benefit of U.S. Provisional Application Ser. No. 60/759,823, filed Jan. 18, 2006, the disclosure of which is incorporated herein in its entirety.

BACKGROUND OF THE INVENTION

I. The Field of the Invention

The present invention relates to compositions including minerals complexed by amino acids. More particularly, the present invention relates to compositions including amino acid/mineral compounds having increased solubility, absorption, and/or bioavailability.

II. The Related Technology

Chelated minerals have become well known for nutritional supplementation. A wide range of nutritionally-relevant minerals have been chelated by amino acids in order to improve the therapeutic potential of the mineral. In part, amino acids have been shown to increase solubility of the mineral in the digestive system, thereby increasing bioavailability of the mineral.

The structure, chemistry and bioavailability of amino acid chelates is well documented in the literature, such as in Ashmead et al., Chelated Mineral Nutrition, (1982), Chas. C. Thomas Publishers, Springfield, Ill.; Ashmead et al., Intestinal Absorption of Metal Ions, (1985), Chas. C. Thomas Publishers, Springfield, Ill.; Ashmead et al., Foliar Feeding of Plants with Amino Acid Chelates, (1986), Noyes Publications, Park Ridge, N.J.; and U.S. Pat. Nos. 4,020,158; 4,167,564; 4,216,143; 4,216,144; 4,599,152; 4,725,427; 4,774,089; 4,830,716; 4,863,898; 4,725,427; 5,292,538; 5,516,925; 5,596,016; 6,114,379; 6,166,071; 6,407,138; 6,426,424; 6,458,981; 6,518,240; 6,706,904; 6,710,079; and 6,716,814, which are all incorporated herein by reference.

Iron is an example of a nutritionally-relevant mineral that is utilized in a variety of biological processes. While iron may be present in many foods of an ordinary diet, it may not be adequately absorbed into the body. As a consequence, it is estimated that approximately 500 million people may have iron deficiency even though their food includes iron. Contrary to popular beliefs, iron deficiencies are not limited to developing countries, and are present in a significant portion of the developed world. In the United States, about 11% of women between 16 and 49 years of age and about 9% of children between 1 and 2 years of age have been classified as iron deficient. Iron deficiency, such as iron deficiency anemia, has been treated with oral iron supplementation in the form of iron chelates (e.g., FERROCHEL® from Albion Advanced Nutrition).

Dietary iron can be obtained either as heme iron from beef, lamb, pork, and poultry or as nonheme iron from vegetables, whole grains, fortified grain products, and supplements. Beef and chicken liver are the richest sources of iron. In general, red meats (e.g., beef, veal, lamb) are richer in iron than white meat (e.g., poultry and fish). Heme iron is more bioavailable than nonheme iron because it is a soluble complex absorbed intact by endocytosis. Nonheme iron may form insoluble complexes in the alkaline medium of the small intestines rendering it unavailable for mucosal uptake. Absorption of nonheme iron also depends on availability of an iron-binding mucosal transport protein (e.g., transferrin) to facilitate uptake from the intestines.

Of the two forms of nonheme iron in the diet, the reduced form (e.g., ferrous) is more bioavailable than the oxidized form (e.g., ferric). On average, 10% of dietary iron is available for mucosal uptake, but the efficiency of absorption can increase three-fold in times of need because of increased synthesis of mucosal iron-binding protein. In addition to increased demand, intestinal absorption of nonheme iron is enhanced in acidic pH and in the presence of free amino acids. Acidic foods, such as tomato sauce or orange juice, consumed with a nonheme iron food source, such as pasta or breakfast cereal, can significantly increase the amount of iron absorbed from the meal.

Nonheme iron absorption efficiency may be reduced by use of antacids or high dose calcium supplements. Phytates and oxalates may also decrease bioavailability of nonheme iron. High dose supplements of calcium, zinc, manganese, magnesium, and/or copper can reduce iron absorption through competition for mucosal uptake. Tannic acid in coffee and tea can also adversely affect iron absorption. Consumption of coffee or tea one hour before or after consumption of a nonheme iron dietary source can reduce absorption of this mineral by as much as 40%.

Iron deficiency anemia is the most common nutritional deficiency disease worldwide. Inadequate dietary intake and relatively inefficient absorption of iron from low cost sources contribute to poor iron status. Iron is distributed in small amounts in the food supply with an average of 10 mg provided in each 1000 kcal of food consumed. Groups most at risk of iron deficiency are children, pregnant and menstruating women, and repeat blood donors. Blood loss of significant amounts for any reason can also contribute to iron deficiency.

Impairment in energy metabolism and neurological function may occur with depletion of iron reserves even in the absence of hematologically detectable anemia. Uncorrected iron deficiency (>120 days) can progress to iron-deficiency anemia, which is characterized by low hemoglobin levels from lack of sufficient iron for synthesis, and by decreased mean corpuscular volume of red blood cells due to lack of sufficient iron to support growth. Microcytic hypochromic changes must be accompanied by low serum ferritin to confirm that the hematologic changes observed are specific to iron status and not related to either copper or vitamin B6 status.

Other symptoms of iron deficiency with or without clinically detectable anemia include short attention span, apathy, irritability, hypoactivity, and impaired cognitive development in children. In the adult population, iron deficiency contributes to poor immunocompetence, irregular heart beat, and fatigue. Paleness of oral mucosal tissue, concave pale nail beds, and behavioral changes can also signify the presence of iron deficiency.

Even though amino acid chelates have been found to be beneficial for improving the bioavailability of mineral supplements, additional improvements are continually being sought. In part, this is because the industry is responding to consumer demands for mineral supplements that are more effective, more efficient, and less costly. As a result, mineral supplements such as amino acid chelated minerals, are available in a wide variety of formulations and modalities of administration. However, it has been recognized that additional improvements in the preparation and/or formulation of amino acid chelates can further improve the therapeutic value of mineral supplements.

Therefore, it would be advantageous to have an amino acid and mineral-containing composition and method of preparation that can provide increased mineral solubility and/or bioavailability. Additionally, it would be beneficial to have an amino acid and mineral-containing composition that has been prepared to have increased solubility and/or increased absorption characteristics.

SUMMARY OF THE INVENTION

Generally, the present invention relates to mixed amino acid/mineral compounds, compositions containing mixed amino acid/mineral compounds, methods of preparing mixed amino acid/mineral compounds, and therapeutic regimens utilizing compositions containing mixed amino acid/mineral compounds. Mixed amino acid/mineral compounds of the present invention can be characterized as having a mineral bound by at least two different types of amino acids, referred to hereinafter as "mixed amino acid/mineral compounds." Mixed amino acid/mineral compounds can have improved bioavailability by having increased solubility, and/or increased absorption through the gastrointestinal ("GI") tract.

In one embodiment, the present invention includes a mixed amino acid/mineral compound. The compound includes a mineral bound by a first amino acid that is different from a second amino acid. Generally, the molar ratio of the first amino acid and the second amino acid is from about 1:0.1 to about 1:10; however, larger ratios may be used in some instances. The compound is characterized as having increased solubility and/or increased absorption from the GI tract compared to a compound with either only the first amino acid or the second amino acid. The mineral can be any nutritionally-relevant mineral.

In one embodiment, the present invention includes a composition that contains a mixed amino acid/mineral compound including at least two different amino acids bound to a mineral. The composition can also include one or more organic acids and/or one or more salt derivatives of an organic acid. The organic acid can be any edible acid that can be formed into a pharmaceutically acceptable salt. Optionally, the organic acid(s) and/or salt(s) can increase the solubility of the compound and/or increase the absorption of the compound from the GI tract.

In one embodiment, the present invention includes a method of manufacturing a mixed amino acid/mineral compound by introducing a first amino acid, a second amino acid, a mineral, and optionally organic acid(s)/salt(s) into a reaction vessel to form a reaction mixture. In the reaction vessel, the organic acid is deprotonated to increase the acidity of the reaction mixture. The first amino acid and second amino acid base bind to the mineral to form a mixed amino acid/mineral compound. In some instances, the binding is through chelation.

In one embodiment, the present invention includes a method of manufacturing a mixed amino acid/mineral compound of the present invention by introducing a first amino acid, a second amino acid, a mineral, and optionally organic acid(s)/salt(s) in a reaction vessel to form a reaction mixture. In the reaction vessel, the organic acid is deprotonated to increase the acidity of the reaction mixture. The first amino acid and second amino acid become bound to the mineral to form a mixed amino acid/mineral compound. Optionally, the binding is through chelation.

In one embodiment, the present invention includes a method of reducing iron deficiency in a human or animal. The method includes administering a composition containing a mixed amino acid/iron compound of the present invention to a human or animal having a medical condition with iron deficiency as a contributing factor or symptom.

These and other advantages and features of the present invention will become more fully apparent from the following description and appended claims, or may be learned by the practice of the invention as set forth hereinafter.

DETAILED DESCRIPTION OF THE PREFERRED EMBODIMENTS

Generally, the present invention is directed to mixed amino acid/mineral compounds, compositions containing mixed amino acid/mineral compounds, methods of preparing mixed amino acid/mineral compounds, and/or therapeutic or prophylactic uses of compositions containing mixed amino acid/mineral compounds. Compositions including mixed amino acid/mineral compounds can have improved bioavailability by having increased solubility, and/or increased absorption of the compound through the GI tract. Compositions containing mixed amino acid/mineral compounds incorporating one or more minerals such as, for example but not limited to iron, can be absorbed by the mucosal cells of the intestine and are subsequently dissociated into mineral and amino acid components within the intestinal mucosa.

I. Amino Acid/Mineral Compounds

The present invention includes mixed amino acid/mineral compounds comprising a mineral bound to at least two different types of amino acids. By using two different amino acids, the specific beneficial properties of each of the amino acids can be combined with a single mineral or multiple minerals. As such, the solubility, absorption, bioavailability, hydrophilicity, hydrophobicity, dissociation, and other unique properties of the specific amino acids utilized can be combined in order to provide an improved compound. The improved compound can increase the therapeutic value of a given mineral so that a more effective therapeutic regimen can be obtained.

Mixed amino acid/mineral compounds of the present invention include mixed amino acids that each chelate with the mineral (e.g., fully chelated compounds), mixed amino acids that each complex with the mineral (e.g., fully complexed compounds), and mixed amino acids wherein one amino acid chelates the mineral and one amino acid complexes with the mineral (e.g., chelated/complexed compounds). Additionally, compositions of the present invention containing mixed amino acid/mineral compounds, may include fully chelated compounds, chelated/complexed compounds, fully complexed compounds, and/or combinations thereof. For example, a fully complexed compound exists when a plurality of potentially differing amino acids complex with a single mineral, wherein each amino acid includes only one coordinate bond with the mineral. By definition, a "chelate" must have at least two coordination bonds within a single molecule, such as an amino acid or organic acid. In any event, a mineral that is complexed with at least two amino acids can provide enhanced solubility and/or bioavailability. Moreover, a mineral that is complexed with an amino acid can also be chelated by the amino acid in order to achieve a particular therapeutic purpose (e.g., chelated and/or complexed compounds).

In one embodiment, the mineral can be fully chelated with one or more amino acid chelates. As used herein, the term "fully chelated" is meant to refer to the mineral being chelated by a maximal number of chelates. Also, compounds may be referred to as being "substantially fully chelated" meaning that a majority of the compounds have minerals that are fully chelated and a minority of the compounds have mineral(s)

that are not fully chelated. In any event, a fully chelated mineral can have the same number of bonds with the amino acids as the coordinate number. The coordination number of the mineral defines the coordination arrangement, which can be a polyhedron arrangement such as a tetrahedron, square plane, octahedron, and the like. Often, the coordination number is defined as being equal to the number of bonds between the amino acids and the central mineral atom. As such, the mineral being chelated can have the maximum number of bonds with the amino acids as are possible for the mineral. This can include from 2 to 8 bonds.

In one embodiment, the mineral can be partially chelated with amino acids. This can include the mineral being chelated with at least one amino acid, or preferably two amino acids, wherein the mineral can have a coordinate number that enables further coordination, such as iron(III). A partially chelated mineral can result from incomplete chelation, but can also be present when the mineral is complexed with another ligand, such as an organic acid.

In one embodiment, a compound having a chelate can include a mineral having at least a first chelated amino acid and a second non-chelated (e.g., complexed) amino acid. An amino acid must bind a mineral through at least two bonds in order to be "chelated" with the mineral. As such, the present invention provides for a mineral having at least one chelated amino acid and a non-chelated or complexed amino acid (i.e., an amino acid having only one bond with the mineral). Thus, a compound can include a mineral that has only one coordination site bound to a single amino acid (e.g., non-chelated or complexed).

In one embodiment, a compound can include a mineral chelated by a first amino acid and bound to a second non-chelated amino acid, and at least a first complexed organic acid. As such, a mineral chelated by a single amino acid can also be bound by an amino acid through one bond as described herein. Additionally, the mineral is also complexed with an organic acid. This can include the mineral having only one bond with the organic acid. In some instances the mineral can have more than one bond so as to be chelated by the organic acid.

In one embodiment, the compound can include a mineral chelated by a first amino acid and complexed with at least one organic acid. Similar to the foregoing embodiments, the mineral is chelated by at least one amino acid, and is further complexed with an organic acid. This can include the mineral being chelated by the organic acid when two binding sites are present on the organic acid. Optionally, the mineral is bound by at least two organic acids, wherein chelation may occur by either or both organic acids when possible.

In one embodiment, the mineral can be complexed with at least a first amino acid and at least a first organic acid. As such, the mineral is non-chelated. This can include the mineral being complexed with an amino acid through only one bond. Also, this can include the mineral being complexed with the organic acid through only one bond. In any event, a mineral can be stably complexed with amino acids and organic acids in order to obtain suitable bioavailability of the mineral.

In one embodiment, the mineral can be complexed with at least two different amino acids and at least a first organic acid. In this embodiment, the mineral is complexed with two different amino acids, wherein neither amino acid has more than one bond with the mineral. Similarly, the organic acid only forms one coordination bond with the mineral.

In one embodiment, a compound in accordance with the present invention can be configured to have increased solubility by including at least two different amino acids. The solubility of the compound can range from about 1.5 moles/L ("M") to about 7.5 M, more preferably from about 2.25 M to about 5 M, and most preferably from about 2.5 M to about 3 M. Optionally, additional solubilizing agents can be used to further increase the solubility of the compound.

A. Minerals

Compositions in accordance with the present invention can be prepared with one or more nutritionally-relevant minerals or other metals. Preferably, the minerals in compositions of the present invention can be chelates or complexes, or chelated and complexed as discussed above. It is preferred that the mineral be a physiologically active mineral that is used in a biological process or recommended to be consumed for nutritional or health purposes. Such minerals can be mono, di, or trivalent cationic metals. Examples of such metals include for example but are not limited to calcium, magnesium, manganese, iron, copper, zinc, potassium, cobalt, chromium, molybdenum, vanadium, sodium, phosphorus, selenium, and the like. Preferred minerals include magnesium, manganese, iron, copper, zinc, cobalt, chromium, molybdenum, lithium, rubidium, cesium, and francium. However, any metal that can be prepared as described herein can be prepared as a mixed amino acid/metal compound.

The appropriate mineral can be selected for treatment or prevention of a human or animal condition. For example, conditions that include iron deficiency as a contributing factor or symptom can be prevented and/or treated with a mixed amino acid/iron compound that can include two different types of amino acids. Another example includes a mixed amino acid/calcium compound for treating osteoporosis and the like. Additionally, various other conditions can be prevented and/or treated with compositions comprised of other types of chelated minerals. In a preferred embodiment, the mineral includes iron(II), which is also referred to as $Fe^{2+}$.

In one embodiment, the mineral content of the composition can be varied in accordance with the therapeutic and formulation needs. This can modulate the amount of mineral per dose as well as the amount of mineral in relation to the amino acid chelates and/or complexes. As such, the mineral content of a composition can range from about 5% to about 50% by weight.

B. Amino Acids

The present invention can include the use of amino acids complexed with a mineral. This can include the amino acids having a single bond with the mineral. The present invention can likewise include the use of amino acids to chelate a mineral. This can include amino acids having at least two bonds with the mineral. Amino acids complexed with minerals can impart improved solubility to the mineral and can be attributed to increases in absorption from the GI tract. This can also be true of amino acid chelated minerals. While complexed amino acid-mineral compositions can be beneficial, chelated amino acid-mineral compositions are preferred.

Various criteria can be used in selecting one of the amino acids to be complexed with the mineral, including matching the criteria of a desired product and/or functionality with an amino acid capable of providing the same. For example, a criterion can be selecting the amino acid in order to achieve the smallest particle size. Usually, the size of an amino acid can be directly proportional to the size of a compound including the same. For example, glycine can be selected as the first amino acid to provide the smallest compound size when the second amino acid is not glycine.

Another criterion for selecting one of the amino acids can be related to cost. While cost may not be an indicator of functionality, it is nonetheless an important factor in product development and production. Also, basing the selection of one amino acid on cost can allow for the selection of the second amino acid to be more functional in the instance a more functional amino acid is also more costly. For example, glycine and/or aspartic acid can be selected as cost-effective amino acids.

Another criterion for selecting one of the amino acids can be based on avoiding chemical issues related to racemic mixtures of a type of amino acid. In some instances amino acids can be present as L-isomers and D-isomers. However, the D-isomers are not as important as L-isomers in biological systems. In order to avoid racemic issues, glycine can be selected as one of the amino acids. Also, the selection of only L-isomer amino acids can also avoid racemic issues.

Another criterion for selecting one of the amino acids can be based on increasing absorption of the compound from the GI tract and/or increasing mineral transport in other anatomical locations. For example, aspartic acid has been shown to increase the absorption of iron-containing proteins by lactoferrin and transferrin. Also, serine and histidine may play an important role in increasing the absorption of the compound.

Another criterion for selecting one of the amino acids can be based on increasing the solubility of the compound. For example, aspartic acid and/or other charged polar amino acids can be selected to improve the solubility of the compound. More particularly, aspartic acid can increase the solubility of the compound in an amount comparable to the increased solubility provided by solubilizing agents such as malic acid and/or succinic acid.

The amino acids that can be used in the present invention include all essential and non-essential amino acids and corresponding salts. Also, the amino acids may be chemically modified into amino acid analogs within the scope of the present invention. Accordingly, the amino acids can be generally selected from the group consisting of alanine, arginine, asparagine, aspartic acid, cysteine, cystine, glutamine, glutamic acid, glycine, histidine, hydroxyproline, isoleucine, leucine, lysine, methionine, ornithine, phenylalanine, proline, serine, threonine, tryptophan, tyrosine, and valine.

In one embodiment, any of the amino acids used to complex or chelate the mineral can be characterized as having a non-polar, neutral polar, or charged polar residue. Accordingly, such non-polar, neutral polar, or charged polar residues can be selected for solubility, absorbability, and bioavailability parameters. Also, various combinations of non-polar, neutral polar, or charged polar residues can be used to provide the compounds with multifunctional capabilities, because certain physical characteristics are well known in the art to be attributed to selected amino acids. As such, the characteristics of the amino acids can be combined to provide an improvement in the therapeutic value of the compositions containing one or more of such compounds.

Generally, non-polar amino acids include alanine, valine, leucine, isoleucine, methionine, phenylalanine, glycine, tryptophan, and proline. The neutral polar amino acids include serine, threonine, cysteine, asparagine, glutamine, and tyrosine. The charged polar amino acids include lysine, arginine, histidine, aspartate, and glutamate.

In one embodiment, it is preferred for the composition to include a compound having a charged polar amino acid chelate that can increase the solubility of the chelated mineral. Further, it is preferable for the charged polar amino acid to be an aspartate or aspartic acid.

In one embodiment, it is preferred for the chelate to include a compound having a first amino acid and a second amino acid. Generally, the ratio of the first and second amino acids can be tailored to increase the bioavailability of the composition. In some instances, the ratio of the selected amino acids can be modulated for increased solubility, absorption, and/or bioavailability. In other instances, any ratio of the selected amino acids can be used. The general molar ratio of the first amino acid and the second amino acid can be from about 1:0.2 to about 1:7, more preferably from about 1:0.5 to about 1:5, and most preferably about 1:1. These molar ratios are suitable for the following amino acid combinations: (a) glycine and methionine; (b) glycine and aspartic acid; (c) lysine and methionine; (d) lysine and aspartic acid; (e) methionine and aspartic acid; and others. However, the molar ratio of the glycine to lysine can be from about 1:0.09 to about 1:15, more preferably from about 1:0.1 to about 1:10, and most preferably about 1:1.

C. Organic Acids

In one embodiment, a mineral can be formulated with an organic acid, such as an edible acid or corresponding salt, to provide increased solubility, absorption, and/or bioavailability. In some instances the organic acid or salt is complexed with the mineral, while in others, the organic acid or salt chelates the mineral. Also, the organic acid or salt can be combined with a mixed amino acid/mineral compound-containing composition.

Also, the use of an edible acid allows for its use in a consumable preparation. The edible acid can be any type of acidic compound that can be used in a pharmaceutical, nutraceutical, or dietary supplement formulation. Accordingly, the use of materials that produce products or byproducts used in foods can greatly simplify the synthesis protocols that otherwise may require additional separation steps for removal of unfavorable or unwanted byproducts. Examples of edible acids include but are not limited to malic acid, fumaric acid, citric acid, lactic acid, benzoic acid, tartaric acid, adipic acid, succinic acid, acetic acid, phosphoric acid, propionic acid, sulfuric acid, pimelic acid, maleic acid, various amino acids, and combinations thereof. Additionally, reference to an organic acid includes the corresponding salts.

In one embodiment, succinic acid or its corresponding salt can be combined with the mixed amino acid/mineral compound. Succinic acid can be used to modulate the solubility of the compound, and can increase absorption from the GI tract. As such, succinic acid can be a preferred organic acid.

In one embodiment, malic acid or its corresponding salt can be combined with the mixed amino acid/mineral compound. Malic acid can be used to increase the solubility of the compound, which may increase bioavailability. As such, malic acid can be a preferred organic acid.

In one embodiment, both succinic acid and malic acid or their corresponding salts can be combined with the mixed amino acid/mineral compound in accordance with the foregoing. The combination of succinic acid and malic acid or their corresponding salts can improve solubility and absorption in order to increase the bioavailability of the mineral.

In one embodiment, it is preferred for the composition to include a mixed amino acid/mineral compound having a first organic acid and a second organic acid. The ratio of the first and second organic acids can be tailored to increase the bioavailability of the composition. As such, the molar ratio of the first organic acid and the second organic acid can be from about 1:0.1 to about 1:25, more preferably from about 1:0.25 to about 1:10, even more preferably from about 1:0.5 to about 1:5, and most preferably at about 1:1.

II. Amino Acid/Mineral Compositions

The present invention includes a new therapeutic composition of mixed amino acid/mineral compounds that utilize two different amino acids. That is, the mixed amino acid/mineral compound includes a first amino acid and a different second amino acid, wherein the amino acids can be present in a specified molar ratio. Accordingly, any of the foregoing compounds whether chelated, complexed (e.g., non-chelated), or complexed/chelated can be used in the subject therapeutic composition.

Additionally, the compounds can include at least one, and preferably two, organic acids or salt derivatives thereof, which can be in a specified ratio. Usually, the organic acids are present in the composition with or without being chelated with the mineral; however, there are instances where the organic acid does chelate the mineral. Also, the organic acid may be present as the corresponding salt. The total amount of the mineral and a total amount of the organic acid and/or salt derivative of the first organic acid can have a weight ratio of about 1:0.1 to about 1:25.

Optionally, the combination of amino acids, and optionally the organic acids, can produce substantially fully chelated compounds. A substantially fully chelated compound, such as a compound containing iron, can be obtained in a purer state than has been previously possible. Additionally, the substantially fully chelated compound can provide increased stability and/or solubility, which can translate into improved bioavailability when administered to humans and animals in an oral dosage form. For example, $Fe^{2+}$ can be fully chelated by two amino acids and $Fe^{3+}$ can be fully chelated by three amino acids. Alternatively, substantially fully chelated minerals can be used in compositions that include a combination of amino acid chelates and complexes.

Accordingly, the process of preparing compositions of the present invention can be modified in order to achieve compounds having fully chelated minerals. However, the composition can also include compounds having minerals that are not fully chelated. This can include compositions with compounds where more than about 90% of the minerals are fully chelated, more preferably more than about 95% of the minerals are fully chelated, and most preferably more than about 98% of the minerals are fully chelated. Such compositions can be obtained with compounds utilizing with iron as the mineral as well as the other minerals or combinations of minerals.

In one embodiment, the composition can include compounds having fully chelated minerals, compounds having complexed minerals, and compounds having complexed/chelated minerals. The combination of chelated minerals, complexed minerals, and chelated/complexed minerals can take advantage of the benefits afforded by each without requiring expensive and time-consuming purification protocols. While the complexed minerals may not provide the level of bioavailability obtained by chelated minerals, they nevertheless can impart characteristics beneficial to solubility, absorption, and bioavailability. As such, any of the compounds described herein can be formulated into a beneficial mineral therapy or supplement composition.

In one embodiment, the composition can further include excess or free amino acids. Amino acids are beneficial substances that are routinely found in many dietary supplements. As such, the free amino acids can be incorporated into the composition to provide an additional therapeutic effect. Additionally, the process of preparing the amino acid chelated minerals can utilize excess amino acids in order to produce fully chelated minerals. Also, the use of different types of amino acids can lead to full mineral chelation. In any event, the molar ratio of the mineral to total amino acid in the composition (which includes chelated, complexed, and free amino acids) can be tailored depending on therapeutic uses and formulation needs. For example, the mineral to amino acid molar ration can be less than 1:20, more preferably less than about 1:10, and most preferably less than about 1:5.

Usually, the mineral to amino acid ratio can be related to the coordination number of the mineral in its particular state of reduction.

In some instances a mineral that can have different states of oxidation, may be preferably utilized at a specific oxidative state. Such a preference may result from a specific oxidative state being important for obtaining bioactivity. Accordingly, it may be preferable for the compound to be prepared with the mineral having the preferred oxidative state. However, there may be instances where a composition includes chelated minerals having the preferred and non-preferred oxidative states. For example, $Fe^{2+}$ may be considered to be a preferred oxidative state and $Fe^{3+}$ may be considered to be a non-preferred oxidative state. In part, compositions that include $Fe^{2+}$ and $Fe^{3+}$ may result from both oxidative states being present during a manufacturing process. The ratio of preferred to non-preferred states of reduction may be proportional to the rates of reaction for each state as well as the rate at which one state changes (e.g., oxidation or reduction) into the other state.

In one embodiment, the compositions of the present invention can be prepared to include compounds with a majority of the minerals in the preferred state of oxidation. Briefly, an acidic component such as an organic acid, can be utilized to drive the reaction for the preferred state of oxidation when included as a reactant. Additionally, the acidic component may inhibit minerals having lower states of oxidation from being further oxidized to a higher state of oxidation. For example, citric acid can inhibit $Fe^{2+}$ from being oxidized to $Fe^{3+}$. Alternatively, basic components may inhibit minerals having higher states of oxidation from being reduced to a lower state of oxidation.

In the instance where the mineral is iron, the composition can include more than about 90% of the iron being $Fe^{2+}$ and less than about 10% of the iron being $Fe^{3+}$. More preferably, more than about 95% of the iron can be $Fe^{2+}$ and less than about 5% of the iron can be $Fe^{3+}$. Even more preferably, more than about 98% of the iron can be $Fe^{2+}$ and less than about 2% of the iron can be $Fe^{3+}$. Most preferably, more than about 99% of the iron can be $Fe^{2+}$ and less than about 1% of the iron can be $Fe^{3+}$. Additionally, the other minerals that can be chelated in accordance with the present invention can also be prepared with substantially the same percentages of preferred and non-preferred oxidative states.

In one embodiment, the composition can be prepared to be at least substantially devoid of carbohydrates. Usually, carbohydrates are used in dietary supplements as fillers or for other reasons. However, certain diets may restrict carbohydrate intake. As such, the composition can be prepared without adding any carbohydrates.

In one embodiment, the composition can be formulated into an oral dosage form for animal and human consumption. Oral dosage forms are well known in the art, and can be in the form of a solid, liquid, gel, paste, capsule, caplet, sprinkle, tablet, soft-gel, elixir, nutritional bar, reconstitutable powder, cereal, sports drink, or sports gel.

In one embodiment, the composition can include additional components, such as flavoring agents, nutritional agents, mineral agents, active pharmaceutical agents, and absorption promoting agents. These types of additives are well known in the art.

In one embodiment, a composition including the mixed amino acid/mineral compound can be characterized by its tap density. This can include the tapped density of composition in the form of powders, granules, pellets, and the like. For example, the tap density of a powder can be obtained when the container having the powder is tapped or vibrated under specified conditions while being loaded. Each particle of a solid material (e.g., particle) can have the same true density after grinding, milling, or processing, but more geometric space may be occupied by the material. In other words, the geometric density can be 50% less than true density if the particles are spherical. Handling or vibrating the powder can cause the smaller particles to be entrained into spaces between the larger particles. When the geometric space occupied by the powder can decrease, its density generally increases. In the instance no further natural particle packing can be measured without the addition of pressure the maximum particle packing is achieved. Under controlled conditions of tap rate, tap force, container volume, and/or container diameter, the condition of maximum packing efficiency can be highly reproducible. The tap density of a powdered form of a composition in accordance with the present invention can range from about 0.2 g/mL to about 1.9 g/mL, more preferably from about 0.3 g/mL to about 1.45 g/mL, and most preferably from about 0.4 g/mL to about 0.95 g/mL.

In one embodiment, a composition including the mixed amino acid/mineral compound can be characterized by its particles, which can include a wide range of particle sizes and shapes. Usually, the particles are substantially spherical; however, agglutination can create particles that have various shapes and sizes. Additionally, the amount of agglutination can be controlled in order to produce particles having desired size limitations. For example, the agglutination can produce particles that have a size so as to not pass through 325 mesh, more preferably not through 220 mesh, even more preferably through not through 180 mesh, and most preferably not through 80 mesh. Alternatively, the particles can be characterized as being between about 20 mesh to about 220 mesh, more preferably between about 40 mesh and 180 mesh, even more preferably between 50 mesh and 100 mesh, and most preferably between about 60 mesh to about 80 mesh. In the most preferred embodiment, 100% of the particles in a composition can pass through a 60 mesh screen.

In one embodiment, the particles can have a dimension of at least 40 microns. Preferably, the dimension can be at least about 80 microns, more preferably at least 100 microns, even more preferably, at least about 200 microns, and most preferably at least about 250 microns.

For example, a composition in accordance with the present invention can include a ferrous glycinate aspartate. As such, the composition can include 77% ferrous glycinate aspartate chelate, 10% succinic acid, 7% malic acid, 4% moisture, 2% maltodextrin, and less than 0.1% silicon dioxide by weight.

For example, another composition in accordance with the present invention can include a ferrous glycinate aspartate. As such, the composition can include 84.5% ferrous glycinate aspartate chelate, 8% succinic acid, and 7% malic acid.

III. Preparing Amino Acid/Mineral Compositions

In one embodiment, the present invention includes a method of preparing mixed amino acid/mineral compounds. Such a method can include introducing a first amino acid and a second amino acid into a reaction vessel, wherein the first amino acid is different from the second amino acid. At least one organic acid is also introduced into the reaction vessel at any time. A mineral in any suitable form can also be introduced into the reaction vessel at any time. It is preferable for the mineral to be in the form of a powdered metal. Additionally, suitable solvents, such as water, can be used to solubilize and/or suspend the reagents.

The reaction is initiated when the mineral comes into contact with either of the amino acids. Additionally, the organic acid can become deprotonated in order to increase the pH of the reaction mixture. An increase in the acidity can increase the rate at which the amino acids complex and chelate with the mineral, and can increase the percentage of minerals that are fully chelated. Further, when the mineral is iron(II), an increase in acidity can inhibit oxidation to iron(III).

In one embodiment, the process of preparing the mixed amino acid/mineral compound can increase the bioavailability of the mineral. In part, the solubility and absorption of the mineral can be increased by the selection of the amino acids and/or selection of the organic acids utilized to drive the reaction. As such, the method can include determining an amino acid (e.g., aspartic acid) that may be utilized to increase absorption of the compound from the GI tract. This can include selecting an amino acid that can increase the ability of the mineral to be absorbed from the lumen into an enterocyte, and/or enhance the binding and transfer of the amino acid/mineral compound within the enterocyte.

In one embodiment, the process of preparing the mixed amino acid/mineral compound can include selecting the type and/or amount of at least one of the amino acids. This can include using any of the foregoing criteria for making such a selection of at least one of the amino acids and, preferably, for at least two of the amino acids. For example, the amino acids can be selected based on at least one of the following selection criteria: (a) large compounds; (b) small compounds; (c) cost; (d) racemic issues; (e) increasing absorption; (f) increased solubility; or (g) increased bioavailability.

In one embodiment, the process of preparing the mixed amino acid/mineral compound can include selecting the type and/or amount of an organic acid to increase solubility. As such, malic acid can be selected to increase the solubility of the amino acid/mineral compound. Similarly, the type and/or amount of an organic acid can be selected to improve the absorption of the compound, which can include selecting succinic acid. Also, the type and/or amount of an organic acid, such as succinic acid, can be selected to improve the transfer of the mineral, such as iron, across the basolateral membrane. Additionally, a combination of amino acids such as malic acid and succinic acid, can be selected in order to improve the bioavailability of the mineral in the compound.

In one embodiment, the process of preparing the mixed amino acid/mineral compound can include determining a reaction protocol that results in a desired ratio of the mineral in the preferred oxidative state relative to the non-preferred oxidative state. Such a determination can be made by one of the following: (a) modulating the starting amount of mineral in the preferred oxidative state relative to the non-preferred oxidative state; (b) modulating the amount of organic acid to drive the chelation; (c) modulating the type of organic acid to drive the chelation; and (d) modulating the pH of the reaction mixture.

For example, ferrous glycinate aspartate can be prepared by combining iron(II) with glycine and aspartic acid in the presence of succinic acid and malic acid. At chemical equilibrium, greater than about 97% of the iron(II) ions can be chelated with glycine and aspartic acid. The resulting product is spray-dried without prior removal of the succinic acid or malic acid. The compound can be highly hygroscopic and may contain water in variable amounts.

IV. Administering Amino Acid/Mineral Compositions

The mixed amino acid/mineral compound and compositions including the same can be used to prevent and/or treat various conditions of mineral deficiency, disease states, or other medical conditions associated with the mineral deficiency. However, dietary supplements including the amino acid/mineral compounds are preferably used as prophylactic measures to prevent and/or inhibit mineral deficiencies and/or factors or symptoms of the same. For example, mixed amino acid/mineral (e.g., iron) compounds in accordance with the present invention can be used to prevent and/or treat iron deficiency and associated medical conditions that cause or are caused from iron deficiency.

Iron is involved in energy metabolism as an oxygen carrier in hemoglobin, and as a structural component of cytochromes in electron transport. Additionally, iron is a structural component at the catalytic site of a large number of enzymes covering a wide array of diverse metabolic functions. These include neurotransmitter synthesis and function, phagocyte antimicrobial activity, hepatic detoxification systems, and synthesis of DNA, collagen, and bile acids. In humans, iron is an essential component of proteins involved in oxygen transport. It is also essential for the regulation of cell growth and differentiation. Iron deficiency limits oxygen delivery to cells, resulting in fatigue, poor work performance, and decreased immunity. Thus, the mixed amino acid/mineral compound can be used to supply iron for the purposes described herein and others well known in the art.

In one embodiment, a composition that includes a mixed amino acid/iron compound and at least one organic acid can be used to prevent and/or treat any iron deficiency. For example, the composition can prevent and/or treat any condition related to iron deficiency that is described herein. As such, a purer, more soluble, stable mixed amino acid/iron compound with an inherent iron absorption promoter can be more beneficial than traditional chelated irons, such as ferrous bis-glycinate.

Accordingly, a method of reducing iron deficiency can include administering a composition comprising one or more mixed amino acid/iron compounds to a human or animal having a medical condition in which iron deficiency is a contributing factor or symptom. The composition containing one or more mixed amino acid/iron compounds can be administered in an effective amount to prevent and/or treat a medical endpoint associated with iron deficiency. This can include administering the mixed amino acid/iron compound containing composition as a food fortificant.

In one embodiment, a composition including one or more mixed amino acid/iron compounds can be utilized in a method for preventing and/or treating a medical condition resultant from a physiological or pathological state where mineral replacement is beneficial. As such, the present invention can be administered to prevent and/or treat physiologic and pathologic states where mineral replacement either corrects or ameliorates a specific syndrome, symptom, clinical sign, and/or set of symptoms or clinical signs. Also, the present invention can inhibit complications associated with toxic substances through competitive absorption, inhibition of absorption, and/or prevention of the absorption of other toxic substances.

In one embodiment, compositions including one or more mixed amino acid/iron compounds can be used as a hematinic agent. This can be used to prevent and/or treat iron deficiencies and associated complications arising from any of the following: pathologic diseases that would result in hematologic consequences; chronic diseases such as chronic renal failure; HIV; connective tissue disease: immune related and autoimmune diseases; chronic diseases; cancer; rheumatoid arthritis; conditions leading to or contributing to blood loss such as GI bleeding; GI diseases; peptic ulcer disease; gastritis; colon cancer; colon polyps; inflammatory bowel disease; tropical sprue; celiac disease; infectious diseases; parasites; hookworm; malaria; iatrogenic complications arising from the administration of drugs such as erythropoetin; NSAIDs; steroids; agents causing reduced platelet function; proton pump inhibitors; H2 antagonists; post-surgical complications of procedures such as gastrectomy; gastric bypass; vagotomy; donating blood for blood banks or in preparation for elective surgery such as orthopedic surgery; joint replacement; gynecological surgery; fibroid uterus.

In one embodiment compositions including one or more mixed amino acid/iron compounds can be used in conditions associated with the childbearing years, for example, prenatal; pregnancy; menses; lactation; post-pregnancy where gestational and neurodevelopmental effects on offspring are well recognized.

In one embodiment compositions including one or more mixed amino acid/iron compounds can be used in neurological conditions such as restless leg syndrome; cognitive complications; neuro-developmental complications; chronic fatigue; exercise and peak physiologic performance optimization.

In one embodiment compositions including one or more mixed amino acid/iron compounds can be used in conditions in which competitive absorption would reduce absorption of toxic levels of heavy metals contributing to lead poisoning; mercury poisoning; arsenic consumption and cadmium consumption or inhaled from cigarette smoke.

In one embodiment, the efficacy of administering to humans or animals, compositions including a mixed amino acid/iron compound used as a hematinic agent or to prevent and/or treat iron deficiencies and associated diseases, can be measured by conventional and relatively straightforward biochemical markers which are currently well recognized by those skilled in the art to demonstrate effective administration such as, for example, serum iron, serum ferritin, iron binding capacity, transferrin, and transferrin saturation. These classical measurements may be helpful to demonstrate an effective dose for many well recognized indications, for example, a rise in the hemoglobin, iron or ferritin levels in iron deficiency anemia, but may not adequately reflect more subtle iron deficient states such as, but not limited to, restless leg syndrome in which only a clinical response to administration of said compound may be measured. Examples of such clinical responses include decreased observed muscle restlessness as well as decreased involuntary muscle activity measured by neuromuscular stimulatory tests, sleep studies, and the like. A greater understanding of the complex metabolic processes involved in iron absorption and metabolism has led to newer biomedical markers that are and could be more useful to detect changes in iron absorption, transport, metabolism, and the clinical implications thereof such as red cell and reticulocyte indices, plasma cytokines and iron metabolism regulators such as hepcidin, iron regulatory proteins, iron transport proteins such as transferrin receptor, ferroportin as well as the divalent metal transporters ("DMTs"), duodenal cytochromes, hephaestin to name only a few of the type of biomarkers that could be useful in biochemical assays. The ratio of serum transferrin receptor ("sTFR") to serum ferritin ("R/F ratio") has been shown to be an excellent biochemical method to demonstrate iron storage levels. Also, other relational assays and combinations of assays can be helpful for more exquisite and clinically meaningful measurements. Also, these and other biomarkers can be used to determine whether toxic or other damaging effects from an abundance of iron in the body are likely to be present or occur such as markers of oxidative stress, or cell damage.

In one embodiment, the mixed amino acid/mineral compounds can be prepared and administered to achieve Daily Reference Intakes ("DRI") for iron. See Table 1 below for iron DRIs.

TABLE 1

Daily Reference Intakes for Iron
Life Stage Iron (mg/day)

| | | |
|---|---|---|
| Infants | 0-6 months | 0.27 |
| | 7-12 months | 11 |
| Children | 1-3 years | 7 |
| | 4-8 years | 10 |
| Males | 9-13 years | 8 |
| | 14-18 years | 11 |
| | 19-30 years | 8 |
| | 31-50 years | 8 |
| | 51-70 years | 8 |
| | >70 years | 8 |
| Females | 9-13 years | 8 |
| | 14-18 years | 15 |
| | 19-30 years | 18 |
| | 31-50 years | 18 |
| | 51-70 years | 8 |
| | >70 years | 8 |
| Pregnancy | <18 years | 27 |
| | 19-50 years | 27 |
| Lactation | <18 years | 10 |
| | 19-50 years | 9 |

On the other hand, excess amounts of iron can result in toxicity and even death. Since nonheme iron absorption efficiency decreases with increasing dosage, iron toxicity from consumption of food sources is rare. However, consumption of large amounts of alcohol increases mucosal iron uptake, particularly among individuals with hemochromatosis or who are carriers of this recessive trait, which is characterized by failure to regulate iron absorption. Symptoms of this genetic disorder include chronic fatigue, weight loss, arthritis, mouth pain, heart palpitations and depression.

Iron supplements may be fatal for adults when taken in doses of 200-250 mg/kg from body weight. Iron poisoning may also occur in children who take adult supplements even at low doses. Individuals who receive repeated blood transfusions are most at risk of iron toxicity. The upper limit of safety for iron established by the Food and Nutrition Board of the Institute of Medicine is approximately 45 mg daily for adults. See Table 2 below for more age- and gender-specific guidelines.

TABLE 2

Iron Tolerable Upper Intake Levels
Life Stage Iron (mg/day)

| | | |
|---|---|---|
| Infants | 0-6 months | 40 |
| | 7-12 months | 40 |
| Children | 1-3 years | 40 |
| | 4-8 years | 40 |
| Males, | 9-13 years | 40 |
| Females | 14-18 years | 45 |
| | 19-70 years | 45 |
| | >70 years | 45 |
| Pregnancy | <18 years | 45 |
| | 19-50 years | 45 |
| Lactation | <18 years | 45 |
| | 19-50 years | 45 |

Accordingly, the mixed amino acid compounds of the present invention can be prepared and administered to provide iron below the toxic levels and/or below the iron tolerable upper intake levels. Similarly, mixed amino acid/mineral compounds having minerals other than iron can be used to prevent and/or treat complications associated with such minerals.

In yet another embodiment, mixed amino acid/calcium compounds may be useful in the treatment of such disease states that benefit from effective administration of calcium. Such disease states include but are not limited by: conditions that affect the musculoskeletal system such as osteoporosis, osteopenia, muscular hyper-excitability and hypotonia, conditions in the cardiovascular system such as hypertension and stroke, neuropsychiatric conditions such as premenstrual syndrome, colon cancer as well as hypocalcemia from any cause such as hypoparathyroidsm, vitamin D deficiency or endocrine or iatrogenic causes.

EXAMPLES

The following examples are provided to illustrate embodiments of the invention and are not intended to be limiting. Accordingly, some of the examples have been performed via experiment and some are prophetic based on techniques, standards, and results well known in the art. Also, it should be apparent that the invention can include additional embodiments not illustrated by example.

Example 1

A chelate-containing composition was prepared in accordance with the present invention. The composition was prepared with the following: 96 g of ferronyl; 218 g of glycine; 70 g of aspartic acid; 37 g of malic acid; 33 g of succinic acid; and 2.2 g of fumed silica gel. The resulting composition is described in Table 3.

TABLE 3

| Ingredient | % Comp |
|---|---|
| Ferronyl | 21.39% |
| Glycine | 47.91% |
| Aspartic Acid | 15.36% |
| Malic Acid | 8.12% |
| Succinic Acid | 7.23% |
| Fumed Silica Gel | 0.48% |
| Total | 100.00% |

Example 2

The solubility of a composition having a mixed amino acid/iron compound was compared to FERROCHEL®. More specifically, the solubility of a composition prepared as described in Example 1 and having the same formulation was used. The compositions were placed into separate saturated solutions and maintained at room temperature overnight. The solutions were collected, solids were filtered off, and the amount of soluble iron was measured. The solution comprising FERROCHEL® resulted in a solubility of 2.022 moles/L ("M"), and the mixed amino acid/iron compound had a solubility of 2.468 M. Thus, the composition having the mixed amino acid/iron compound has improved solubility.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A composition comprising:
a metal chelate consisting essentially of:
   a iron(II);
   a glycine chelated to the iron(II); and
   an aspartic acid chelated to the iron(II), wherein the metal chelate has a solubility from about 2.25 M to about 5 M;
a malic acid or salt thereof in an amount of from about 7% to about 8% by weight of the composition to improve solubility of the metal chelate in water;
a succinic acid or salt thereof in an amount of from about 7% to about 10% by weight of the composition to improve intestinal absorption of the metal chelate; and
with the metal chelate in an amount of from about 77% to about 84.5% by weight of the composition.

2. A composition as in claim 1, wherein the composition comprises:
   succinic acid or salt thereof in an amount of about 10% by weight of the composition;
   malic acid or salt thereof in an amount of about 7% by weight of the composition; and
   the chelate in an amount of about 77% by weight of the composition.

3. A composition as in claim 1, wherein the composition comprises:
   succinic acid or salt thereof in an amount of about 8% by weight of the composition;
   malic acid or salt thereof in an amount of about 7% by weight of the composition; and
   the chelate in an amount of about 84% by weight of the composition.

4. A composition as in claim 1, wherein the composition comprises:
   succinic acid or salt thereof in an amount of about 7% by weight of the composition;
   malic acid or salt thereof in an amount of about 8% by weight of the composition;
   glycine in an amount of about 48% by weight of the composition;
   aspartic acid in an amount of about 15% by weight of the composition; and
   the iron atom in an amount of about 21% by weight of the composition.

5. A composition as in claim 1, wherein the composition comprises:
   fumed silica in an amount of about 0.5% by weight of the composition;
   succinic acid or salt thereof in an amount of about 7% by weight of the composition;
   malic acid or salt thereof in an amount of about 8% by weight of the composition;
   glycine in an amount of about 48% by weight of the composition;
   aspartic acid in an amount of about 15% by weight of the composition; and
   the iron atom in an amount of about 21% by weight of the composition.

6. A chelate as in claim 1, wherein the chelate has a solubility of about 2.5 M.

* * * * *